(12) United States Patent
Jenkinson et al.

(10) Patent No.: US 7,690,412 B1
(45) Date of Patent: Apr. 6, 2010

(54) DRIVE AXLE WITH AIR PASSAGE FOR TIRE INFLATION SYSTEM

(75) Inventors: Scott Jenkinson, Davisburg, MI (US); Jeremy Tertzakian, Chesterfield, MI (US); Steven R. Miller, Clarkston, MI (US); David Gonska, Beverly Hills, MI (US); Tracy G. Ellis, White Lake, MI (US); Christopher J. Wittry, Georgetown, KY (US); John D. Morgan, Medina, OH (US); Richard Decaire, Rochester Hills, MI (US); Norman D. Austin, Kutztown, PA (US); Yenkai Wang, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 12/264,335

(22) Filed: Nov. 4, 2008

(51) Int. Cl.
*B60C 23/10* (2006.01)

(52) U.S. Cl. .................. 152/416; 152/417

(58) Field of Classification Search ........... 152/415, 152/416, 417
See application file for complete search history.

(56) References Cited

U.S. PATENT DOCUMENTS

| | | | | | |
|---|---|---|---|---|---|
| 1,657,023 | A | * | 1/1928 | Mitchell et al. ............. | 152/417 |
| 1,816,693 | A | * | 7/1931 | Pippin ..................... | 152/417 |
| 2,090,089 | A | * | 8/1937 | Wiegand ................... | 152/417 |
| 2,152,159 | A | * | 3/1939 | Smith et al. ............... | 73/146.4 |
| 2,177,042 | A | * | 10/1939 | Michael .................... | 301/38.1 |
| 2,452,527 | A | * | 10/1948 | Peter ....................... | 152/417 |
| 2,634,782 | A | * | 4/1953 | Van Dyke Firth, Sr. et al. .................... | 152/417 |
| 2,634,784 | A | * | 4/1953 | Fitch ....................... | 152/417 |
| 2,989,989 | A | * | 6/1961 | Holbrook et al. ........ | 137/625.69 |
| 4,431,043 | A | * | 2/1984 | Goodell et al. ............. | 152/417 |
| 4,582,107 | A | * | 4/1986 | Scully ...................... | 152/417 |
| 4,782,878 | A | * | 11/1988 | Mittal ...................... | 152/417 |

FOREIGN PATENT DOCUMENTS

| EP | 410723 | A1 | * | 1/1991 |
|---|---|---|---|---|
| GB | 2178705 | A | * | 2/1987 |

\* cited by examiner

*Primary Examiner*—Russell D Stormer
(74) *Attorney, Agent, or Firm*—Carlson, Gaskey & Olds

(57) ABSTRACT

A drive axle assembly includes a non-rotating spindle having a cylindrical body defining an internal cavity and an axle shaft assembly mounted within the internal cavity for rotation about an axis. A seal assembly is positioned within the internal cavity to provide a sealed chamber between the axle shaft assembly and the non-rotating spindle. A first air passage is formed within the cylindrical body and includes an air inlet to be in fluid communication with an air supply and an air outlet in fluid communication with the sealed chamber. A second air passage is formed within the axle shaft assembly and receives air input from the sealed chamber and includes an air output to be associated with at least one tire.

16 Claims, 3 Drawing Sheets

US 7,690,412 B1

DRIVE AXLE WITH AIR PASSAGE FOR TIRE INFLATION SYSTEM

TECHNICAL FIELD

The subject invention relates to a drive axle that includes an air passage that forms part of a tire inflation system. More specifically, the air passage is formed at least in part between an axle shaft assembly and a spindle.

BACKGROUND OF THE INVENTION

Tire inflation systems are used on vehicles, such as tractor-trailer vehicles for example, to maintain tire inflation pressures at a desired tire pressure setting. The tire inflation system draws pressurized air from on-board air tanks and supplies this air to an under-inflated tire when tire pressure falls below the desired tire pressure setting.

Drive axles present challenges for routing air from the air tanks to the tires. Typically, air hoses must be routed externally of the axle components and around the outside of the tires. Such a routing configuration takes up a significant amount of packaging space that could otherwise be used for other vehicle components. Further, due to the external mounting, a significant portion of the air hoses is exposed to potentially damaging contact from rocks, debris, etc.

SUMMARY OF THE INVENTION

A drive axle includes an air passage for fluid communication with a tire inflation system. The air passage is formed at least in part between an axle shaft assembly and a spindle.

In one example, a drive axle assembly includes a non-rotating spindle having a cylindrical body defining an internal cavity and an axle shaft assembly mounted within the internal cavity for rotation about an axis. A seal assembly is positioned within the internal cavity to provide a sealed chamber between the axle shaft assembly and the non-rotating spindle. A first air passage is formed within the cylindrical body and includes an air inlet to be in fluid communication with an air supply and an air outlet in fluid communication with the sealed chamber. A second air passage is formed within the axle shaft assembly and receives air input from the sealed chamber and includes an air output to be associated with at least one tire.

In one example, the seal assembly includes first and second seals that are located near an outboard end of the spindle and which are spaced apart from each other in a direction extending along the axis.

These and other features of the present invention can be best understood from the following specification and drawings, the following of which is a brief description.

DETAILED DESCRIPTION OF THE PREFERRED EMBODIMENT

Figure 1:
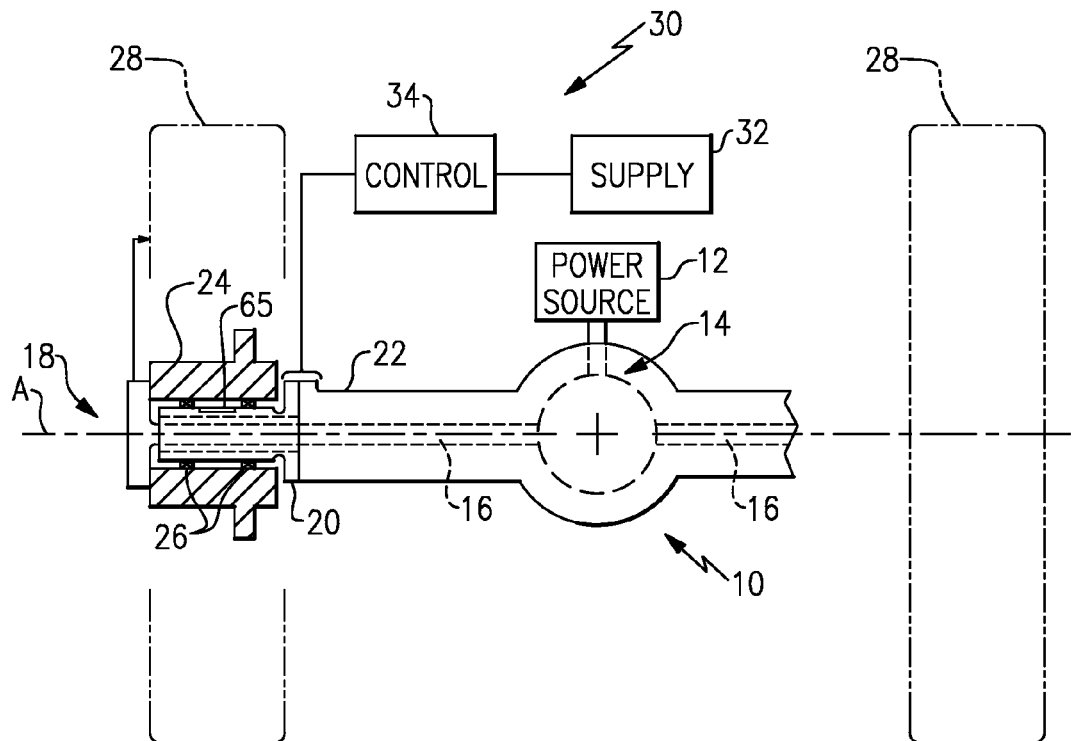
FIG. 1 is a schematic representation of a drive axle assembly in fluid communication with a tire inflation system.

FIG. 1 shows a drive axle 10 receiving driving input from a power source 12, such as an engine or electric motor for example. The driving input drives an input gear assembly 14 that includes a differential mechanism as known. The gear assembly 14 drives axle shafts 16 that are coupled to drive wheel end assemblies 18. One example of a wheel end assembly 18 is shown to the left of FIG. 1. It should be understood that the opposite wheel end assembly 18 would be similarly formed.

The wheel end assembly 18 includes a non-rotating spindle 20 that is mounted to an axle housing 22. The axle housing 22 houses the gear assembly 14 and axle shafts 16. A wheel hub 24 is rotatably supported on the spindle 20 by bearings 26. A tire 28 and associated rim are mounted for rotation with the wheel hub 24 about an axis A.

A tire inflation system 30 includes an air supply reservoir or tank 32 that is used to supply air to the tires 28 when the tires 28 become under-inflated. The tire inflation system 30 includes a control 34 that determines when air is to be supplied and also controls the amount of air supplied as known. The control 34 can be automatically activated via an electronic control unit or other similar device to control the amount of air supplied, or the control 34 can be manually actuated by a vehicle operator. The control 34 can include various valves, sensors, pressure regulators, etc. as known to control distribution of the air from the tank 32. The control 34 is also configured to stop supplying air to a tire if pressure falls below a certain level to prevent the tank 32 from being depleted of air, such as when a tire has experienced a blow-out for example.

Figure 2:
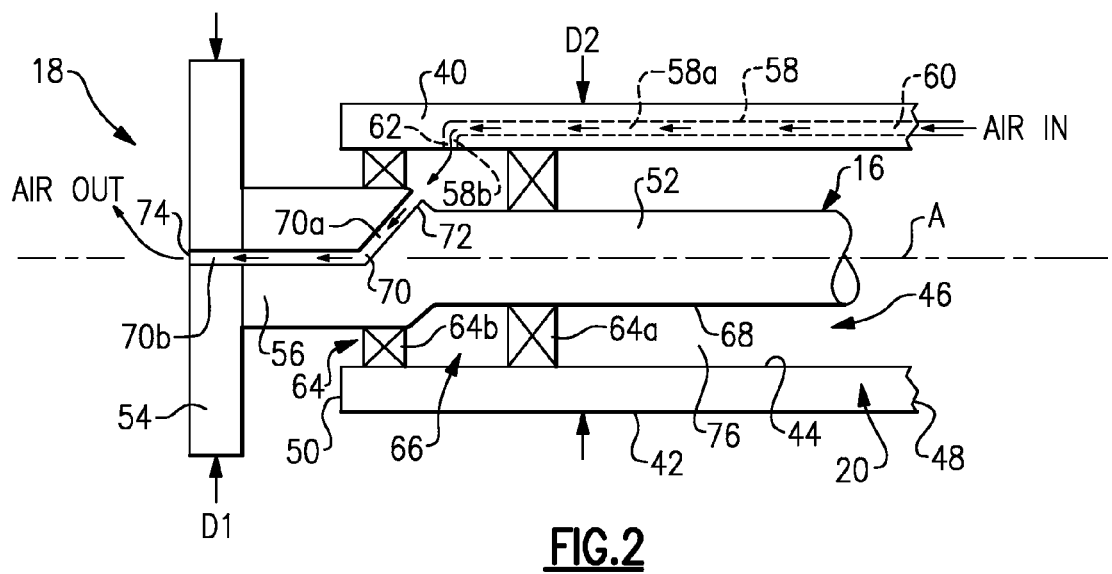
FIG. 2 is one example of an air passage formed between a spindle and an axle shaft assembly.

The control 34 supplies air to the wheel end assembly 18 which includes passages that convey the air to the tire 28. FIG. 2 shows one example of a wheel end assembly 18 as used with the tire inflation system 30. In this example, the spindle 20 includes a cylindrical body 40 having an outer surface 42 and an inner surface 44 that defines an inner cavity 46. The spindle 20 has an inboard end 48 that extends inwardly toward a vehicle center. The spindle 20 extends outwardly to an outboard end face 50.

The axle shaft 16 includes an elongated axle shaft body 52 that extends to a drive flange 54 at an outboard end 56 of the elongated axle shaft body 52. The drive flange 54 has a larger diameter than that of the elongated axle shaft body 52. The drive flange 54 is connected to drive the wheel hub 24 (FIG. 1) about the axis of rotation A. The wheel hub 24 substantially surrounds the spindle 20 and is rotatably supported by the bearings 26. The axle shaft 16 is received within the internal cavity 46 of the spindle 20 and the outboard end 56 extends outwardly of the internal cavity 46 to terminate at the drive flange 54.

In one example, the drive flange 54 is defined by a first outer diameter D1 and the outer surface 42 of the spindle 20 is defined by a second outer diameter D2 that is less than the first outer diameter D1. This facilitates mounting of the wheel hub 24 to the drive flange 54.

An air passage 58 is associated with the spindle 20. In one example, the air passage 58 is formed within the cylindrical body 40 and includes an air inlet 60 that is in fluid communication with the air tank 32 and an air outlet 62 that is in fluid communication with the inner cavity 46. The air passage 58 can be formed by rifle drilling or by other known processing methods. Optionally, a groove could be formed within the spindle 20 to support an air tube 65 (FIG. 1) that would be positioned to form part of the spindle 20.

A seal assembly 64 is positioned within the inner cavity 46 to provide a sealed chamber 66. The air outlet 62 opens into the sealed chamber 66. In one example, the seal assembly 64 includes a first seal 64a and a second seal 64b that are spaced apart from each other along the axis of rotation A. The first seal 64a and the second seal 64b each directly engage the inner surface 44 of the spindle 20 and an outer surface 68 of the axle shaft 16.

In one example, the air passage 58 includes a first portion 58a that extends in a direction generally parallel to the axis of rotation A and a second portion 58b that extends in a direction transverse to the axis of rotation A. The first portion 58a is significantly longer than the second portion 58b.

The axle shaft 16 includes an air passage 70 that has an inlet 72 in fluid communication with the sealed chamber 66 and an outlet 74 to be associated with a tire 28. The air passage 70 includes a first portion 70a that is formed within the elongated axle shaft body 52 through the outboard end 56 and a second portion 70b that is formed within the drive flange 54. These passages can be rifle drilled or formed by using other known processes.

The seal assembly 64 is positioned near the outboard end 56 of the axle shaft 16 at a position that is adjacent to the outboard end face 50 of the spindle 20. Thus, the sealed chamber 66 is provided near an outboard end of the spindle 20, which leaves an unsealed chamber portion 76 within the inner cavity 46 of the spindle 20. Further, the wheel hub 24 surrounds the sealed chamber 66 and seal assembly 64.

Air flows from the supply tank 32 to the air inlet 60, through passage 58 of the cylindrical body 40 to the air outlet 62 at the sealed chamber 66. Air then flows from the sealed chamber 66 through the passage 70 in the axle shaft 16 and then out to the tire 28. Air can enter the passage 58 in the spindle 20 either directly from the control 34 and air tank 32, or air could be supplied to the spindle 20 from a chamber formed within the axle housing 22.

Figure 3:
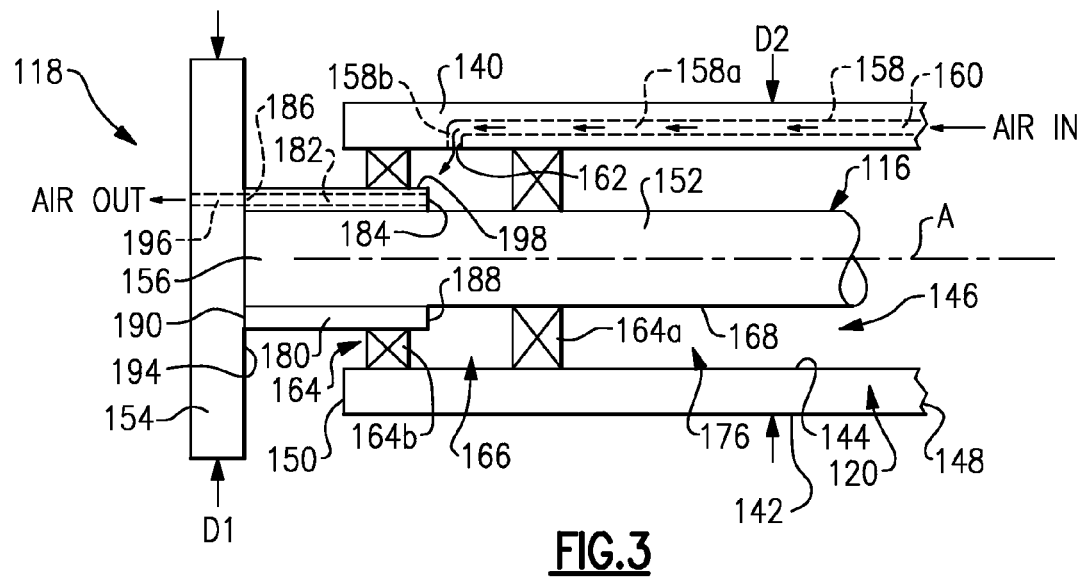
FIG. 3 is another example of an air passage formed between a spindle and an axle shaft assembly.

FIG. 3 shows another example of a wheel end assembly 118 as used with the tire inflation system 30. In this example, a spindle 120 includes a cylindrical body 140 having an outer surface 142 and an inner surface 144 that defines an inner cavity 146. The spindle 120 has an inboard end 148 and extends outwardly to an outboard end face 150.

An axle shaft 116 includes an elongated axle shaft body 152 that extends to a drive flange 154 at an outboard end 156 of the elongated axle shaft body 152. The drive flange 154 is connected to drive the wheel hub 24 about the axis of rotation A. The axle shaft 116 is received within the internal cavity 146 of the spindle 120 and the outboard end 156 extends outwardly of the internal cavity 146 to terminate at the drive flange 154.

As discussed above, a first outer diameter D1 of the drive flange 154 is greater than a second outer diameter D2 of the spindle 120.

An air passage 158 is formed within the cylindrical body 140 and includes an air inlet 160 that is in fluid communication with the air tank 32 and an air outlet 162 that is in fluid communication with the inner cavity 146. As with the configuration discussed above, the air passage 158 includes a first portion 158a that is generally parallel to the axis of rotation A and a second portion 158b is transverse to the axis of rotation A. The first portion 158a is significantly longer than the second portion 158b.

A seal assembly 164 is positioned within the inner cavity 146 to provide a sealed chamber 166. The air outlet 162 opens into the sealed chamber 166. In this example, the seal assembly 164 includes first 164a and second seals 164b that are spaced apart from each other along the axis of rotation A.

The axle shaft 116 includes a sleeve 180 that is fixed to an outboard end 156 of the elongated axle shaft body 152. The sleeve 180 can be attached by welding, press fit, threaded interface, splines, etc. The sleeve 180 includes an air passage 182 that has an inlet 184 in fluid communication with the sealed chamber 166 and an outlet 186 to be associated with a tire 28. The air passage 182 is generally parallel to the axis of rotation A and extends along an entire length of the sleeve 180 from an inboard end face 188 to an outboard end face 190. The outboard end face 190 directly abuts against an inboard end face 194 of the drive flange 154. The outlet 186 is positioned to be in fluid communication with a passage 196 formed within the drive flange 154, and which conveys air to the tire 28.

The seal assembly 164 is positioned near the outboard end 156 of the axle shaft 116 at a position that is adjacent to the outboard end face 150 of the spindle 120. The sealed chamber 166 is provided near an outboard end of the spindle 120 leaving an unsealed chamber portion 176 within an inboard end of the cavity 146. The first seal 164a is positioned directly between the inner surface 144 of the cylindrical body 140 and an outer surface 168 of the axle shaft 116. The second seal 164b is positioned directly between the inner surface 144 of the cylindrical body 140 and an outer surface 198 of the sleeve 180.

Air flows from the supply tank 32 to the air inlet 160, through passage 158 of the cylindrical body 140 to the air outlet 162 at the sealed chamber 166. Air then flows from the sealed chamber 166 through the passage 182 in the sleeve 180, through the passage 196 in the drive flange 154, and then out to the tire 28. Air can enter the passage 158 in the spindle 120 either directly from the control 34 and air tank 32, or air could be supplied to the spindle 20 from a chamber formed within the axle housing 22.

Figure 4:
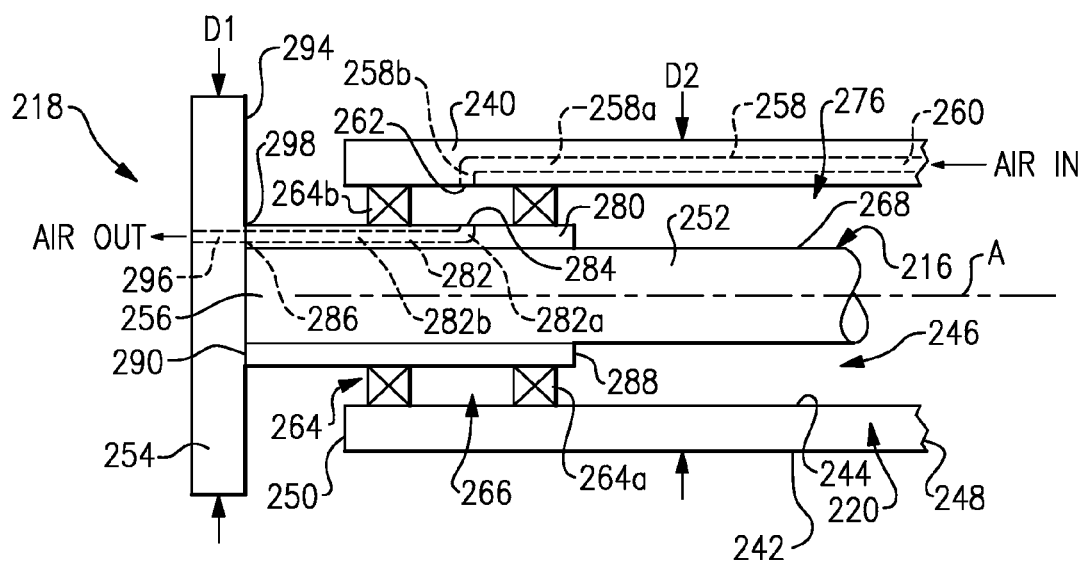
FIG. 4 is another example of an air passage formed between a spindle and an axle shaft assembly.

FIG. 4 shows another example of a wheel end assembly 218 as used with the tire inflation system 30. In this example, a spindle 220 includes a cylindrical body 240 having an outer surface 242 and an inner surface 244 that defines an inner cavity 246. The spindle 220 has an inboard end 248 and extends outwardly to an outboard end face 250.

An axle shaft 216, similar to that of FIG. 3, includes an elongated axle shaft body 252 that extends to a drive flange 254 at an outboard end 256 of the elongated axle shaft body 252. The axle shaft 216 is received within the internal cavity 246 of the spindle 220 and, as discussed above, a first outer diameter D1 of the drive flange 254 is greater than a second outer diameter D2 of the spindle 220.

An air passage 258 is formed within the cylindrical body 240 and includes an air inlet 260 that is in fluid communication with the air tank 32 and an air outlet 262 that is in fluid communication with the inner cavity 246. As with the configuration discussed above, the air passage 258 includes a first portion 258a that is generally parallel to the axis of rotation A and a second portion 258b is transverse to the axis of rotation A. The first portion 258a is significantly longer than the second portion 258b.

A seal assembly 264 is positioned within the inner cavity 246 to provide a sealed chamber 266. The air outlet 262 opens into the sealed chamber 266. In this example, the seal assembly 264 includes first 264a and second seals 264b that are spaced apart from each other along the axis of rotation A.

The axle shaft 216 includes a sleeve 280 that is fixed to an outboard end 256 of the elongated axle shaft body 252. The sleeve 280 can be attached as described above and includes an air passage 282 that has an inlet 284 in fluid communication with the sealed chamber 266 and an outlet 286 to be associated with a tire 28. The air passage 282 includes a first portion 282a that is transverse to the axis of rotation A and a second portion 282b that is generally parallel to the axis of rotation A. The inlet 284 is formed in an outer surface 298 of the sleeve 280 at a position that is outboard of an inboard end face 288 of the sleeve 280. The outlet 286 is formed at an outboard end face 290 of the sleeve 280. The outlet 286 is positioned to be in fluid communication with a passage 296 formed within the drive flange 254 that conveys air to the tire 28.

The seal assembly 264 is positioned near the outboard end 256 of the axle shaft 216 at a position that is adjacent to the outboard end face 250 of the spindle 220. The sealed chamber 266 is provided near an outboard end of the spindle 220 leaving an unsealed chamber portion 276 within an inboard end of the cavity 246. The first seal 264a and the second seal 264b are positioned directly between the inner surface 244 of the cylindrical body 240 and the outer surface 298 of the sleeve 280.

Air flows from the supply tank 32 to the air inlet 260, through passage 258 of the cylindrical body 240 to the air outlet 262 at the sealed chamber 266. Air then flows from the sealed chamber 266 through the passage 282 in the sleeve 280, through the passage 296 in the drive flange 254, and then out to the tire 28. Air can enter the passage 258 in the spindle 220 either directly from the control 34 and air tank 32, or air could be supplied to the spindle 20 from a chamber formed within the axle housing 22.

Figure 5:
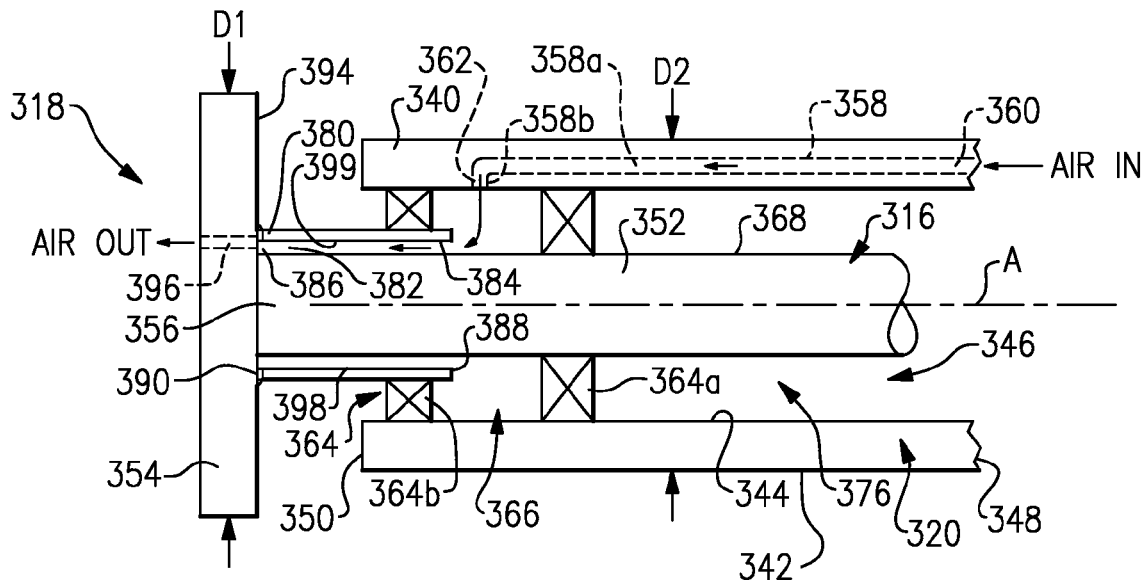
FIG. 5 is another example of an air passage formed between a spindle and an axle shaft assembly.

FIG. 5, shows another example of a wheel end assembly 318 as used with the tire inflation system 30. In this example, a spindle 320 includes a cylindrical body 340 having an outer surface 342 and an inner surface 344 that defines an inner cavity 346. The spindle 320 has an inboard end 348 and extends outwardly to an outboard end face 350.

An axle shaft 316 includes an elongated axle shaft body 352 that extends to a drive flange 354 at an outboard end 356 of the elongated axle shaft body 352. The axle shaft 316 is received within the internal cavity 346 and the outboard end 356 extends outwardly of the internal cavity 346 to terminate at the drive flange 354. As discussed above a first outer diameter D1 of the drive flange 354 is greater than a second outer diameter D2 of the spindle 320.

An air passage 358 is formed within the cylindrical body 340 and includes an air inlet 360 that is in fluid communication with the air tank 32 and an air outlet 362 that is in fluid communication with the inner cavity 346. As with the configuration discussed above, the air passage 358 includes a first portion 358a that is generally parallel to the axis of rotation A and a second portion 358b is transverse to the axis of rotation A. The first portion 358a is significantly longer than the second portion 358b.

A seal assembly 364 is positioned within the inner cavity 346 to provide a sealed chamber 366. The air outlet 362 opens into the sealed chamber 366. In this example, the seal assembly 364 includes first 364a and second seals 364b that are spaced apart from each other along the axis of rotation A.

The axle shaft 316 includes a sleeve 380 that surrounds an outboard end 356 of the elongated axle shaft body 352. The sleeve 380 is attached to an inboard end face 394 of the drive flange 354 by welding, fasteners, etc. The sleeve 380 defines an air passage 382 between an outer surface 368 of the axle shaft 316 and an inner surface 399 of the sleeve 380. The passage 382 has an inlet 384 in fluid communication with the sealed chamber 366 and an outlet 386 to be associated with a tire 28. The air passage 382 is generally parallel to the axis of rotation A and extends along an entire length of the sleeve 380 from an inboard end face 388 to an outboard end face 390. The outboard end face 390 directly abuts against the inboard end face 394 of the drive flange 354. The outlet 386 is positioned to be in fluid communication with a passage 396 formed within the drive flange 354 that conveys air to the tire 28.

The seal assembly 364 is positioned near the outboard end 356 of the axle shaft 316 at a position that is adjacent to the outboard end face 350 of the spindle 320. The sealed chamber 366 is provided near an outboard end of the spindle 320 leaving an unsealed chamber portion 376 within an inboard end of the cavity 346. The first seal 364a is positioned directly between the inner surface 344 of the cylindrical body 340 and an outer surface 368 of the axle shaft 316. The second seal 364b is positioned directly between the inner surface 344 of the cylindrical body 340 and an outer surface 398 of the sleeve 380.

Air flows from the supply tank 32 to the air inlet 360, through passage 358 of the cylindrical body 340 to the air outlet 362 at the sealed chamber 366. Air then flows from the sealed chamber 366 through the passage 382 between the sleeve 380 and axle shaft 316, through the passage 396 in the drive flange 354, and then out to the tire 28. Air can enter the passage 358 in the spindle 320 either directly from the control 34 and air tank 32, or air could be supplied to the spindle 320 from a chamber formed within the axle housing 22.

Figure 6:
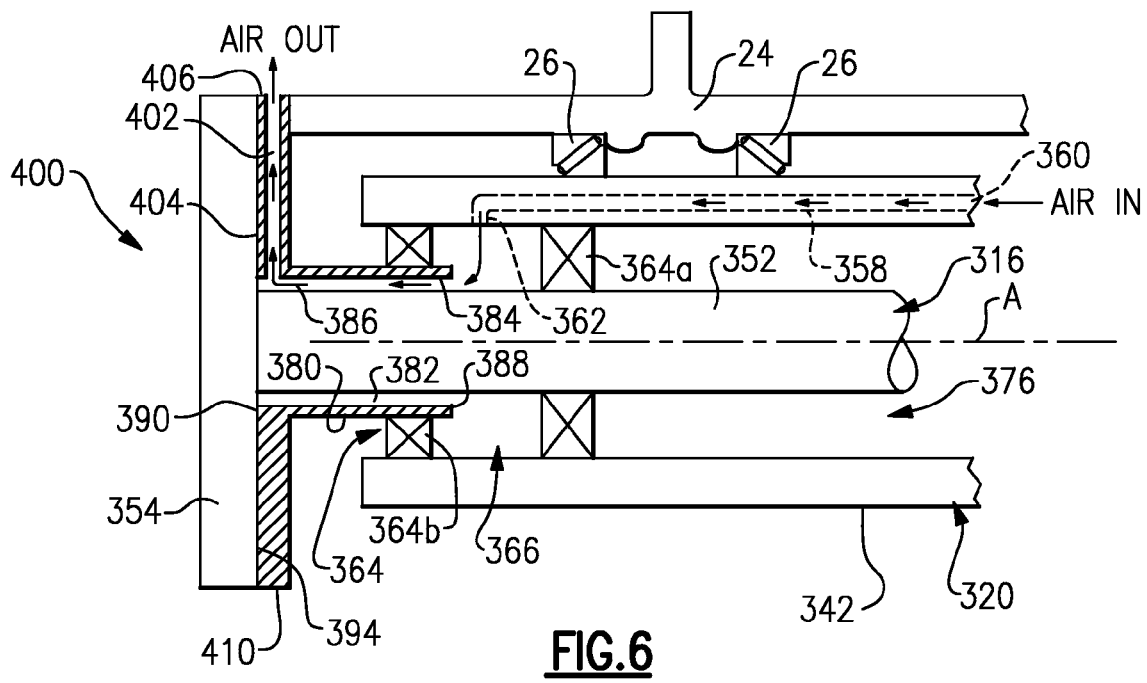
FIG. 6 is another example of an air passage formed between a spindle and an axle shaft assembly.

FIG. 6 shows another example of a wheel end assembly 400 that is similar to that of FIG. 5. In this example, a drive flange plate 410 is fixed to, or formed as part of, the sleeve 382. The air exits the outlet 386 of the sleeve 382 via a passage 402 formed through a plate body 404 of the drive flange plate 410. The passage 402 extends radially outwardly relative to the axis of rotation A and exits at an outlet 406 adjacent the hub 24.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A drive axle assembly comprising:
   a non-rotating spindle having a cylindrical body defining an internal cavity;
   an axle shaft assembly mounted within said internal cavity for rotation about an axis, wherein said axle shaft assembly includes an elongated axle shaft body and a drive flange to be coupled to a rotatable wheel component, and wherein an outboard end of said elongated axle shaft body extends outwardly from said internal cavity to terminate at said drive flange, and wherein said axle shaft assembly includes a tubular sleeve that is positioned to surround said outboard end of said elongated axle shaft body;
   a seal assembly positioned within said internal cavity to provide a sealed chamber between said axle shaft assembly and said non-rotating spindle;
   a first air passage formed within said cylindrical body and including an air inlet to be in fluid communication with an air supply and an air outlet in fluid communication with said sealed chamber; and
   a second air passage formed within said axle shaft assembly, said second air passage receiving air input from said sealed chamber and including an air output to be associated with at least one tire, wherein said second air passage includes a passage portion that is defined at least in part by said tubular sleeve.

2. The drive axle assembly according to claim 1 wherein said seal assembly includes first and second seals that each engage an inner surface of said cylindrical body and an outer surface of said axle shaft assembly, said first and said second seals being spaced apart from each other along said axis.

3. The drive axle assembly according to claim 2 wherein said cylindrical body extends to an outboard end face and wherein an outer surface of said cylindrical body is surrounded by a rotating wheel component at said outboard end face, and wherein said sealed chamber is formed adjacent said outboard end face and is surrounded by said rotating wheel component.

4. The drive axle assembly according to claim 2 wherein said internal cavity includes an unsealed chamber between said cylindrical body and said axle shaft assembly, said unsealed chamber being axially spaced from said sealed chamber along said axis.

5. The drive axle assembly according to claim 1 wherein said first air passage includes a first portion that extends in a direction that is generally parallel to said axis and a second portion that extends in a direction that is transverse to said axis, said first portion being significantly longer than said second portion.

6. The drive axle assembly according to claim 1 wherein said drive flange is defined by a first outer diameter and an outer surface of said spindle is defined by a second outer diameter that is less than said first outer diameter.

7. The drive axle assembly according to claim 1 wherein said second air passage includes a first portion formed within said elongated axle shaft body and a second portion formed within said drive flange, said first portion receiving air input from said sealed chamber and said second portion terminating at said air output.

8. The drive axle assembly according to claim 7 wherein said seal assembly includes first and second seals that each directly engage an outer surface of said elongated axle shaft body and an inner surface of said cylindrical body, said first and said second seals being axially spaced apart from each other along said axis.

9. The drive axle assembly according to claim 1 wherein said seal assembly includes a first seal in direct sealing engagement with an inner surface of said cylindrical body and an outer surface of said axle shaft and a second seal in direct sealing engagement with said inner surface of said cylindrical body and an outer surface of said tubular sleeve.

10. The drive axle assembly according to claim 1 wherein said tubular sleeve includes an outer peripheral surface and an inner peripheral that is in direct contact with an outer surface of said elongated axle shaft body, and wherein said passage portion is formed within a body of said tubular sleeve between said inner and said outer peripheral surfaces.

11. The drive axle assembly according to claim 10 wherein said seal assembly includes first and second seals that are each in direct sealing contact with an inner surface of said cylindrical body and said outer peripheral surface of said tubular sleeve.

12. The drive axle assembly according to claim 10 wherein said seal assembly includes a first seal that is in direct sealing engagement with an inner surface of said cylindrical body and an outer surface of said elongated axle shaft body and a second seal that is in direct sealing engagement with said inner surface of said cylindrical body and said outer peripheral surface of said tubular sleeve.

13. The drive axle assembly according to claim 1 wherein said tubular sleeve includes an outer peripheral surface and an inner peripheral surface that is spaced apart from an outer surface of said elongated axle shaft body, and wherein said passage portion is formed between said inner peripheral surface and said outer surface of said elongated shaft body.

14. The drive axle assembly according to claim 13 wherein said seal assembly includes first and second seals that are spaced apart from each other in a direction along said axis and wherein an inboard end face of said tubular sleeve is located within said sealed chamber at a position between the first and second seals.

15. The drive axle assembly according to claim 14 wherein said first seal directly engages said outer surface of said elongated axle shaft body and an inner surface of said cylindrical body, and wherein said second seal directly engages said outer peripheral surface of said tubular sleeve and said inner surface of said cylindrical body.

16. The drive axle assembly according to claim 1 wherein said tubular sleeve has an outboard end face that abuts against an inboard face of said drive flange.

* * * * *